(12) United States Patent
Lemer

(10) Patent No.: US 12,461,253 B2
(45) Date of Patent: Nov. 4, 2025

(54) CALIBRATOR DEVICE DESIGNED TO MEASURE THE ACTIVITY OF A RADIOELEMENT

(71) Applicant: LEMER PAX, La Chapelle sur Erdre (FR)

(72) Inventor: Pierre-Marie Lemer, Nantes (FR)

(73) Assignee: LEMER PAX, La Chapelle-sur-Erdre (FR)

(*) Notice: Subject to any disclaimer, the term of this patent is extended or adjusted under 35 U.S.C. 154(b) by 857 days.

(21) Appl. No.: 17/767,696

(22) PCT Filed: Oct. 9, 2020

(86) PCT No.: PCT/EP2020/078380
§ 371 (c)(1),
(2) Date: Apr. 8, 2022

(87) PCT Pub. No.: WO2021/069645
PCT Pub. Date: Apr. 15, 2021

(65) Prior Publication Data
US 2024/0120121 A1    Apr. 11, 2024

(30) Foreign Application Priority Data

Oct. 11, 2019  (FR) .................................. 1911331
Jan. 27, 2020  (FR) .................................. 2000788

(51) Int. Cl.
*G01T 1/185*     (2006.01)
*G01T 1/167*     (2006.01)
(Continued)

(52) U.S. Cl.
CPC ............. *G01T 1/185* (2013.01); *G01T 1/167* (2013.01); *G06F 3/167* (2013.01); *G21F 7/04* (2013.01);
(Continued)

(58) Field of Classification Search
CPC ......... G01T 1/167; G01T 1/185; G06F 3/167; G21F 7/04; G21F 7/063; G21F 7/065; G21F 7/068; G21G 2001/0042; G21H 5/02
See application file for complete search history.

(56) References Cited

U.S. PATENT DOCUMENTS 11,497,461 B1 * 11/2022 Vija ..................... A61B 6/4266
12,260,153 B1 *  3/2025 Carlson ................ H04M 3/563
(Continued)

FOREIGN PATENT DOCUMENTS

FR        3011353        4/2015
JP      2004264085 A     9/2004
(Continued)

OTHER PUBLICATIONS

Office Action, issued in Japanese Patent Application No. 2022-521210 dated Apr. 16, 2024.
(Continued)

*Primary Examiner* — Mark R Gaworecki
(74) *Attorney, Agent, or Firm* — NIXON & VANDERHYE

(57) ABSTRACT

Disclosed is a calibrator device designed to measure the activity of a radio element, including: an ionization chamber, intended to receive the radio element; and electronic/computer system for controlling the operation of the calibrator device. The electronic/computer system includes voice control, which include: at least one microphone capable of capturing a voice instruction emitted by the operator; a recognition module designed to convert the voice instruction into a request that can be executed by the electronic/computer system; and a control module designed to control the execution of the request by the electronic/computer system.

20 Claims, 4 Drawing Sheets

(51) Int. Cl.
*G06F 3/16* (2006.01)
*G21F 7/04* (2006.01)
*G21F 7/06* (2006.01)

(52) U.S. Cl.
CPC .............. *G21F 7/063* (2013.01); *G21F 7/065* (2013.01); *G21F 7/068* (2013.01)

(56) References Cited

U.S. PATENT DOCUMENTS

| | | |
|---|---|---|
| 2008/0166292 A1 | 7/2008 | Levin et al. |
| 2010/0006156 A1 | 1/2010 | Schlip et al. |
| 2014/0263990 A1* | 9/2014 | Kawrykow .......... A61N 5/1031 250/252.1 |
| 2015/0283403 A1* | 10/2015 | Kapatoes ............. A61N 5/1071 600/1 |
| 2015/0309184 A1 | 10/2015 | Viscovic |
| 2018/0228010 A1* | 8/2018 | Butani ................... A61B 6/107 |

FOREIGN PATENT DOCUMENTS

| | | | | |
|---|---|---|---|---|
| WO | 01/84558 | 11/2001 | | |
| WO | 03/034444 | 4/2003 | | |
| WO | WO-03048807 A1 * | 6/2003 | ............. | G01T 1/167 |

OTHER PUBLICATIONS

International Search Report for PCT/EP2020/078380 mailed Jan. 21, 2021, 6 pages.
Written Opinion of the ISA for PCT/EP2020/078380 mailed Jan. 21, 2021, 9 pages.
Capintec et al., "CRC-15 calibrator manual-revision P", Owner's manual, https://capintec.com/support/mannuals/crc-15pet-dose-calibrator-manual/, retrieved on Aug. 8, 2020, 82 pages.
Capintec, Inc., CRC-15Pet, Cleaning and Maintenance, Jul. 2007, 15 pages.

* cited by examiner

CALIBRATOR DEVICE DESIGNED TO MEASURE THE ACTIVITY OF A RADIOELEMENT

CROSS-REFERENCE RELATED TO PRIORITY APPLICATIONS

This application is the U.S. national phase of International Application No. PCT/EP2020/078380 filed Oct. 9, 2020 which designated the U.S. and claims priority to FR1911331 filed Oct. 11, 2019 and FR2000788 filed Jan. 27, 2020, the entire contents of each of which are hereby incorporated by reference.

BACKGROUND OF THE INVENTION

Field of the Invention

The present invention relates to the general field of products or sources emitting radioactive radiations.

More particularly, it relates to the field of calibrator devices, designed to measure the activity of a radioelement, in particular but not exclusively of the type of those which are implemented in the field of nuclear medicine for preparing radioactive injectable solutions necessary for scintigraphic examinations, or for preparing radioactive products used in metabolic radiotherapy in the treatment of certain cancers.

Description of the Related Art

The devices called "calibrators", or "radionuclide calibrators" or "dose calibrators", are used to measure the activity of emitting radioactive sources, in particular gamma radiations (in an energy range of a few tens of KeV to several MeV) or beta radiations of energy higher than 1.5 KeV.

One of the main applications of this type of measurement device is the calibration of radiopharmaceutical doses injected to patients in nuclear medicine, but they can also be used for other radioisotope measurement applications, in particular in industrial laboratories or research centres.

These calibrators are consisted of a gas ionisation chamber of the well type, into which the isotope to be measured is introduced.

This chamber delivers a current proportional to the activity of the isotope being tested; it is connected to an electronic/computer control and processing unit that converts this current into voltage, processes the signal and provides indication (in curie or becquerel) of the isotope activity measurement.

To ensure this operation, the calibrator device comprises various electronic equipment, which can be controlled by the operator via a control panel that is provided, for example, with touch buttons or a menu on a computer console.

In particular, the activity measurement being function of the energy spectrum of the radiation emitted by the radionuclides, the calibrators currently on the market propose a manual selection of the isotopes to be measured, from a prerecorded or preprogramed list, in order to allocate to the processing electronics the suitable calibration coefficient corresponding to the radioisotope in presence, to obtain the appropriate radioactivity measurement.

Now, this manual control is error-prone and not ergonomic.

The interactions with the control panel indeed require for the operator to focus alternately on different areas (in particular, a handling area and a control area).

There thus exists a need for a technical solution that would simplify the control of the electronic equipment belonging to the calibrator device.

SUMMARY OF THE INVENTION

In order to remedy the above-mentioned drawback of the state of the art, the present invention proposes a calibrator device, designed to measure the activity of a radioelement.

The calibrator device according to the invention comprises:
an ionisation chamber, intended to receive said radioelement,
an electronic/computer system for controlling the operation of said calibrator device, and
at least one output peripheral, advantageously a display device, potentially completed by a printer,
said electronic/computer system comprising:
processing means, for converting a signal collected within said ionisation chamber into a value of activity of said radioelement, and
control means, for the control of said electronic/computer system by an operator.

The control means comprise voice control means that comprise:
at least one microphone, capable of capturing a voice instruction (V) emitted by said operator,
a recognition module, designed to convert said voice instruction (V) into a request (R) that can be executed by said electronic/computer system, and
a control module, designed to control the execution of said request (R) by said electronic/computer system.

The voice control means will thus enable the operator to control said electronic/computer system via voice instructions.

Such voice control means advantageously constitute a human-machine interface whose interaction is made through voice, also called "voice interface".

This approach thus enables the operator to conduct a handling protocol, and to interact with said electronic equipment, while keeping focus to the handling area.

The operator thus gains in comfort and speed of execution, and can therefore focus to the handling operations.

Other non-limiting and advantageous features of the product according to the invention, taken individually or according to all the technically possible combinations, are the following:
the recognition module is designed to convert said voice instruction (V) comprising a series of words: an activation word (M1), an action word (M2), and possibly at least one setting word (M3);
said electronic/computer system comprises a casing in which at least part of said electronic/computer system is integrated, and said at least one microphone is fitted to said casing or is independent of said casing;
the voice control means comprise a confirmation module designed to reproduce, via said at least one output peripheral, the request (R) from said recognition module;
the control means also comprise manual control means, for the redundant control of said electronic/computer system by said operator.

The present invention also relates to a method of operating a calibrator device according to the invention.

This operating method comprises the following steps:
a step of capturing a voice instruction (V) emitted by said operator, executed by said at least one microphone, a step of converting said voice instruction (V) into a request (R) executable by said electronic/computer system, executed by said recognition module, and a step of controlling the execution of said request (R) by said electronic/computer system, executed by said control module.

The present invention also relates to nuclear medicine equipment, for example for preparing and/or handling low, medium and high energy radiopharmaceutical compositions.

The equipment comprises:

a calibrator device according to the invention, and a radiation protection structure, for protecting an operator against ionising radiations.

According to an embodiment, said radiation protection structure comprises a radiation protection screen.

In this case, the radiation protection screen advantageously comprises a shield made of a radiation protection material; said shield being rotatable about a horizontal axis of rotation, for tilt adjustment, preferably associated with rotational indexing means.

According to another embodiment, said radiation protection structure comprises a radiation protection enclosure suitable for the handling of radioelements by an operator.

The radiation protection enclosure comprises:

radiation protection walls delimiting a sealed volume intended to contain said radioelements, a transparent radiation protection wall, for visual access to said sealed volume, and at least one aperture fitted with a glove, and/or a remote handling interface, for handling operations within said sealed volume.

The radiation protection enclosure also comprises:

at least one piece of electronic equipment, controllable by said operator, and control means, for the control of said at least one piece of electronic equipment by said operator.

Said at least one piece of electronic equipment comprises at least said calibrator device according to the invention.

Other non-limiting and advantageous features of this embodiment according to the invention, taken individually or according to all the technically possible combinations, are the following:

the electronic/computer system of said calibrator device is part of the control means of said radiation protection enclosure or is distinct from said control means of said radiation protection enclosure;

the control means of said radiation protection enclosure comprise voice control means that form the voice control means of said calibrator device, or that are distinct with respect to the voice control means of said calibrator device;

the radiation protection walls comprise two lateral radiation protection walls each including a front edge, said front edge of one at least of said lateral radiation protection walls being fitted with said at least one microphone;

said radiation protection enclosure comprises, in addition to said calibrator device, at least one piece of electric equipment chosen among one at least of the following pieces of electronic equipment: at least one computer comprising data storage means containing a database, operating means coupled to at least one shielded generator compartment, locking means associated with at least one door of at least one airlock fitted to one of said radiation protection walls, means for operating a calibrator spoon, lighting means, disinfection means, a remote handling interface.

Of course, the different features, alternatives and embodiments of the invention can be associated with each other according to various combinations, insofar as they are not mutually incompatible or exclusive.

BRIEF DESCRIPTION OF THE DRAWINGS

Moreover, various other features of the invention emerge from the appended description made with reference to the drawings that illustrate non-limiting embodiments of the invention, and wherein.

DESCRIPTION OF THE PREFERRED EMBODIMENTS

It is to be noted that, in these figures, the structural and/or functional elements common to the different alternatives can have the same references numbers.

Calibrator Device

Figure 1:
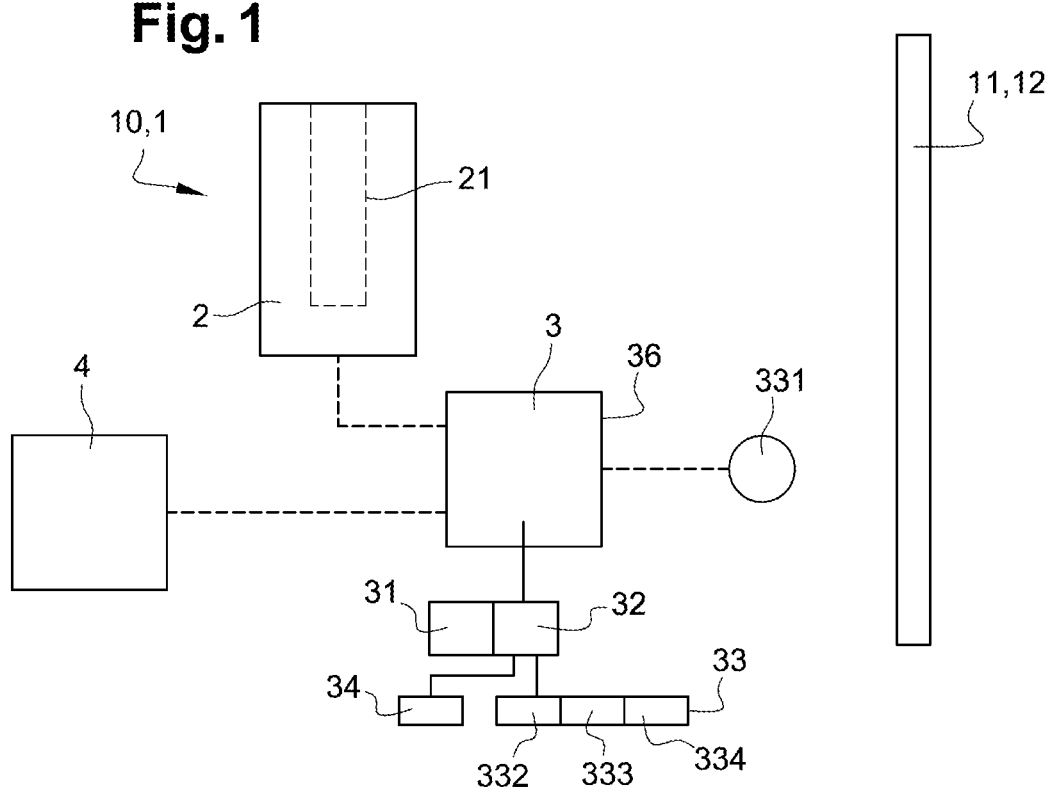
FIG. 1 schematically shows a calibrator device fitted with voice control means.

The calibrator device 1, schematically shown in FIG. 1, is designed to measure the activity of a radioelement.

Such a calibrator device 1 is in particular suited to the field of nuclear medicine, in particular for the preparation of low, medium and high energy radiopharmaceutical compositions.

The calibrator device 1 according to the invention comprises:

an ionisation chamber 2, intended to receive said radioelement, an electronic/computer system 3, for controlling the operation of said calibrator device 1, and at least one output peripheral 4, advantageously a display device, potentially completed by a printer.

The ionisation chamber 2, advantageously a well-type ionisation chamber (conventional per se), intended to receive a radioelement, possibly includes means 21 for operating a calibrator spoon (not shown).

The electronic/computer system 3 comprises:

processing means 31, for converting a signal collected within said ionisation chamber 2 into a value of activity of said radioelement, and control means 32, for the control of the electronic/computer system 3 by an operator.

The electronic/computer system 3 thus forms an electronic/computer unit that ensures, on the one hand, advantageously via the treatment means 31, the treatment of the signal collected within the ionisation chamber 2 to provide an indication of the activity of the radioelement, and on the other hand, advantageously via the control means 32, the operation of this calibrator device 1.

For that purpose, the electronic/computer system 3 advantageously comprises:

a processing unit, also called "calculation unit" or "processor", and data storage means containing a database and at least one computer program.

The processing means 31 advantageously comprise:

an electrometer for measuring the intensity of the ionisation current, and activity calculation electronics.

Moreover, the control means 32 will allow a control of the calibrator device 1 by the operator, at different steps of a handling process.

The control of this calibrator device 1 may consist for example of:

inputting data, and/or setting/adjusting an operation parameter, and/or operating an actuator.

According to the invention, to substantially improve the working conditions of the operator all along this handling process, the control means 32 here comprise voice control means 33 that will enable the operator to control the calibrator device 1 via voice instructions.

Such voice control means 33 advantageously constitute a human-machine interface for the calibrator device 1, whose interaction is made through voice, also called "voice interface".

This approach thus enables the operator to conduct a handling protocol, and to interact with the calibrator device 1 via voice.

Herein, the voice control means 33 comprise:

at least one microphone 331, capable of capturing a voice instruction V emitted by said operator, a recognition module 332, designed to convert said voice instruction V into a request R that can be executed by said electronic/computer system 3, and a control module 333, designed to control the execution of said request R by said electronic/computer system 3.

Said at least one microphone 331 advantageously consists of:

a fixed microphone, carried by the calibrator device 1, or a portable microphone, for example intended to be worn by the operator during a handling operation (for example in the form of an earphone, a lavalier microphone, etc.).

The portable microphone may also be put on a support.

Said at least one microphone 331 is advantageously connected to the control means 32 to form an input peripheral. The recognition module 332 and the control module 333 are integrated to the control means 32.

As described hereinafter in relation with FIG. 2, the recognition module 332, also called "automatic speech recognition module", makes it possible to analyse the human voice captured by means of said at least one microphone 331 to transcribe it as a text (or an instruction or request) usable by a computer.

This recognition module 332 is advantageously chosen among the computer programs comprising instructions that, when the program is executed by a computer, cause the latter to convert the voice instruction $\underline{V}$ into a request $\underline{R}$ intended to be executed by said calibrator device 1.

The voice instruction $\underline{V}$, also called "voice control", then corresponds to the expected action within the calibrator device 1.

Herein, the recognition module 332 is designed to convert a voice instruction $\underline{V}$ comprising a series of words:

an activation word $\underline{M1}$, an action word $\underline{M2}$, and potentially at least one setting word $\underline{M3}$.

Herein, said voice instruction $\underline{V}$ thus advantageously comprises a syntax made up of a series of words:

an activation word $\underline{M1}$, also known as "Wake-up Word" or "Hot Word", to activate the process of conversion of the voice instruction $\underline{V}$ by the voice recognition module 332, then an action word $\underline{M2}$, to define the action expected by said calibrator device 1, and possibly at least one parameter word $\underline{M3}$ (i.e. zero, one or more parameter words $\underline{M3}$) to define at least one parameter/variable specifying the expected action.

As an alternative or a complement to the activation word $\underline{M1}$, the voice recognition module 332 can be activated by a control element, for example a pedal.

To recognise the voice instruction $\underline{V}$, the recognition module 332 can possibly associate the words of the voice instruction $\underline{V}$ with semantic labels (or "tags"), including:

a first tag T1, allocated to the activation word $\underline{M1}$, a second tag T2, allocated to the action word $\underline{M2}$, and possibly at least a third tag T3, in the form of a variable, allocated to the parameter word(s) $\underline{M3}$.

The conversion of the voice instruction $\underline{V}$ by the voice recognition module 332 thus allows generating the request $\underline{R}$ executable by the control module 333.

The control module 333 is advantageously chosen among the computer programs comprising instructions that, when the program is executed by a computer, cause the latter to control the execution of the request $\underline{R}$ by the electronic/computer system 3.

For that purpose, the control module 333 can consist of, or cooperate with, a programmable logic controller.

Generally, the recognition module 332 and the control module 333 can be recorded and executed on the electronic/computer system 3.

As an alternative, the recognition module 332 and the control module 333 can be recorded and executed on a remote computer, for example in the form of a server.

Without being restrictive, the voice instruction $\underline{V}$ is advantageously chosen from a list of predefined voice instructions, recorded in a database. And each voice instruction $\underline{V}$ of this database is advantageously associated with a request $\underline{R}$ (also called "action") intended to be executed by said calibrator device 1.

For example and without being restrictive in anyway, the combination of action words M2/parameter words M3 can be chosen among:

"select"/"Container Name" (for example vial, syringe, capsule), to select a container on the calibrator device 1, "select"/"Isotope Name" (for example F18, Fluorine, Tec, Technetium, Ga67, Gallium), to select an isotope on the calibrator device 1, "patient"/"variable", to select the patient on the calibrator device 1, "stock solution"/"variable", to select the stock solution on the calibrator device 1, "validate", to validate the solution and patient selection on the calibrator device 1, "up" or "down"/"spoon", to move the calibrator spoon up or down using the operating means 21.

The voice control means 33 can also allow said at least one output peripheral 4 (for example screen, printer) to be controlled in a user-friendly and ergonomic way.

The voice control means 33 may also comprise a confirmation module 334 (also called "feedback") designed to reproduce, via said at least one output peripheral 4, the request R from the recognition module 332.

This recognition module 334 is advantageously chosen among the computer programs comprising instructions that, when the program is executed by a computer, cause the latter to reproduce, via said output peripheral, the request from said recognition module 332.

The control means 32 can also comprise manual control means 34 (for example a keyboard and/or a touch screen), for the redundant control of the electronic/computer system 3 by the operator.

Such manual control means 34 are for example useful for controlling a part that is controllable (redundancy), or not controllable, by the voice control means 33.

Still generally, the electronic/computer system 3 may comprise a casing 36 in which is integrated at least part of said electronic/computer system 3 (for example, the processing means 31 and the control means 32).

Said at least one microphone 331 is here arranged remotely from/independent with respect to the casing 36. As an alternative, not shown, said at least one microphone 331 is fitted to this casing 36.

As developed hereafter in relation with the figures, the calibrator device 1, associated with the voice control means 33, can constitute a voice-controlled calibrator device 1, advantageously autonomous; this calibrator device 1 can also be part of nuclear medicine equipment (advantageously in combination with a radiation protection enclosure).

Operating Method

Figure 2:
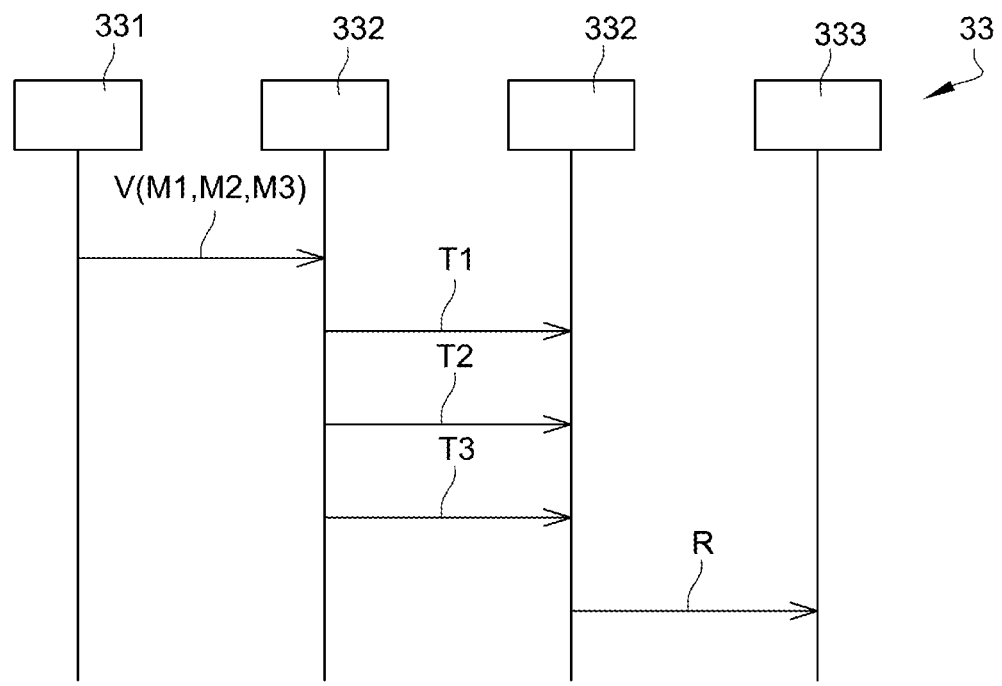
FIG. 2 shows, as a block diagram, a voice recognition algorithm implemented in relation with the calibrator device according to the invention.

The present invention also relates to a method of operating a calibrator device 1 according to the invention, as illustrated in FIG. 2.

This operating method comprises the following steps:
- a step of capturing a voice instruction V emitted by the operator, executed by said at least one microphone 331,
- a step of converting said voice instruction V into a request R executable by said electronic/computer system 3, executed by said recognition module 332, and
- a step of controlling the execution of said request R by said electronic/computer system 3, executed by said control module 333.

In practice, such a calibrator device 1 is of simple and intuitive use in order to easily process the radioactivity measurements, to perform control tests, to keep the essential data on files or labels.

Nuclear Medicine Equipment

Such a calibrator device 1 (with its voice control means 33) can be implemented for different uses conventional per se.

The present invention thus also relates to nuclear medicine equipment 10 comprising the calibrator device 1 according to the invention, for example for preparing and/or handling low, medium and high energy radiopharmaceutical compositions.

Such equipment 10, illustrated in FIGS. 1, 3, 4, 5 and 6, comprises:
- a calibrator device 1 according to the invention, as described hereinabove in relation with FIG. 1, and
- a radiation protection structure 11, for protecting an operator against ionising radiations.

According to an embodiment very schematically illustrated in FIG. 1, the radiation protection structure 11 comprises a radiation protection screen 12.

Such a radiation protection screen 11 is advantageously chosen among the radiation protection screens adapted to the radiopharmaceutical compositions handled.

Such a radiation protection screen 12 is intended to be interposed between the ionisation chamber 2 and the operator.

This radiation protection screen 12 is advantageously made of a radiation attenuation material, for example lead, a plastic material filled with radiation protection metal particles, or also glass filled with radiation protection metal particles.

Figure 3:
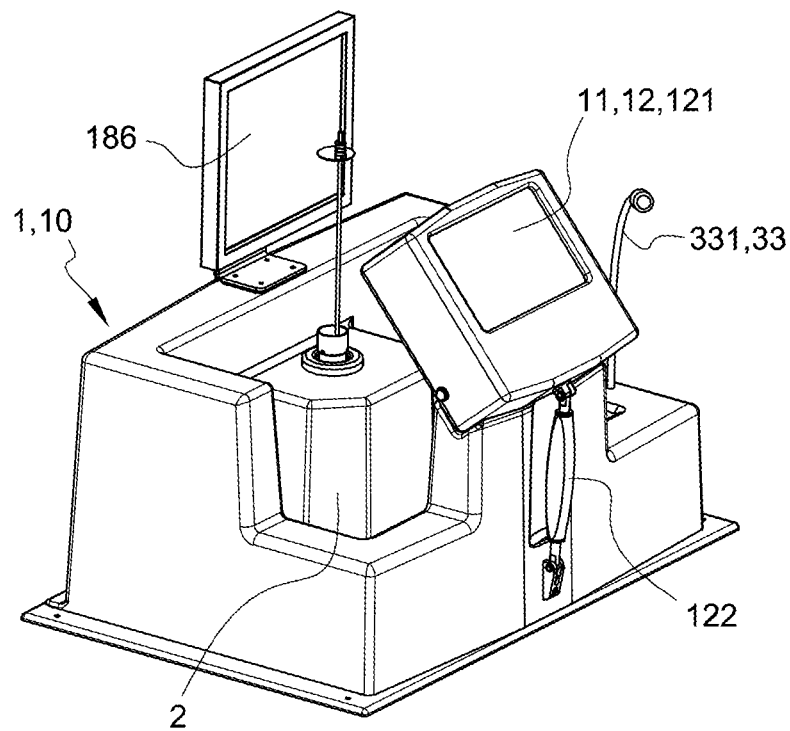
FIG. 3 is a schematic perspective view showing a calibrator device according to the invention, advantageously in the form of a shielding for handling radiopharmaceuticals.
Figure 4:
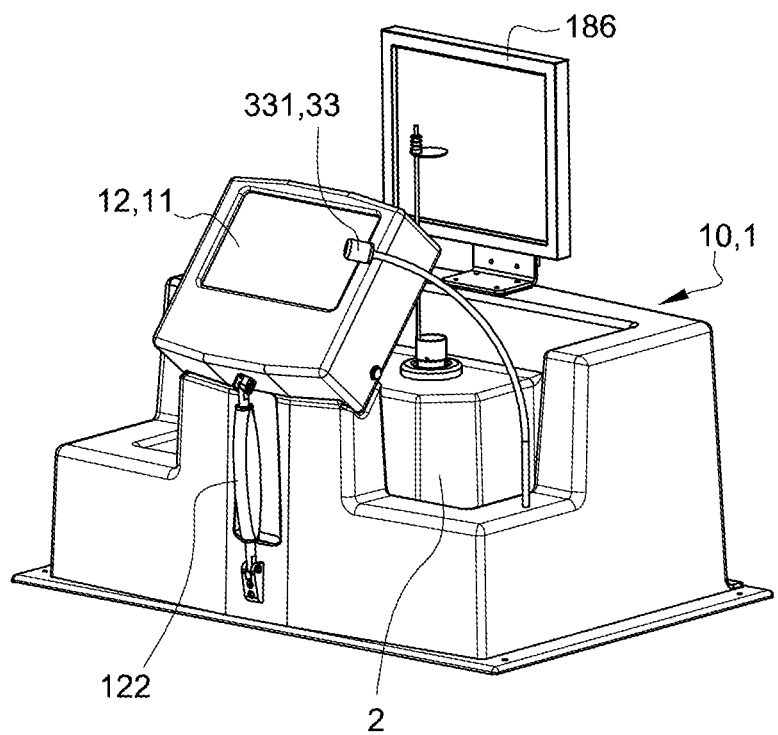
FIG. 4 is schematic view, according to another perspective, of the calibrator device according to FIG. 3.

For example, this embodiment is also illustrated in FIGS. 3 and 4.

This embodiment allows the handling, preparation, fractionation and measurement of radiopharmaceuticals while ensuring the biological safety of the operator.

In these FIGS. 3 and 4, the radiation protection screen 12 comprises a shield 121 made of a radiation protection material (for example, lead glass).

This shield 121 is advantageously rotatable about a horizontal axis of rotation, for tilt adjustment, preferably associated with rotational indexing means 122 (for example, a cylinder).

The equipment 10 is here fitted with a microphone 331, for interaction of the operator with the voice control means 33.

This equipment 10 is here also fitted with at least one output peripheral 186 coupled to a computer (not shown), for example in the form of a display device (screen) or even printing means (not shown), for example for printing a self-adhesive label.

The voice control means 33 thus enable the operator to conduct a handling protocol, and to interact with the equipment 10 via voice.

For example and without being restrictive in anyway, the combination of action words M2/parameter words M3 can be chosen among:
- "select"/"Container Name" (for example vial, syringe, capsule), to select a container on a computer,
- "select"/"Isotope Name" (for example F18, Fluorine, Tec, Technetium, Ga67, Gallium), to select an isotope on the computer,
- "patient"/"variable", to select the patient via the computer,
- "stock solution"/"variable", to select the stock solution via the computer,
- "validate", to validate the solution and patient selection via the computer,
- "up" or "down"/"spoon", to move the calibrator spoon up or down using the operating means.

Figure 5:
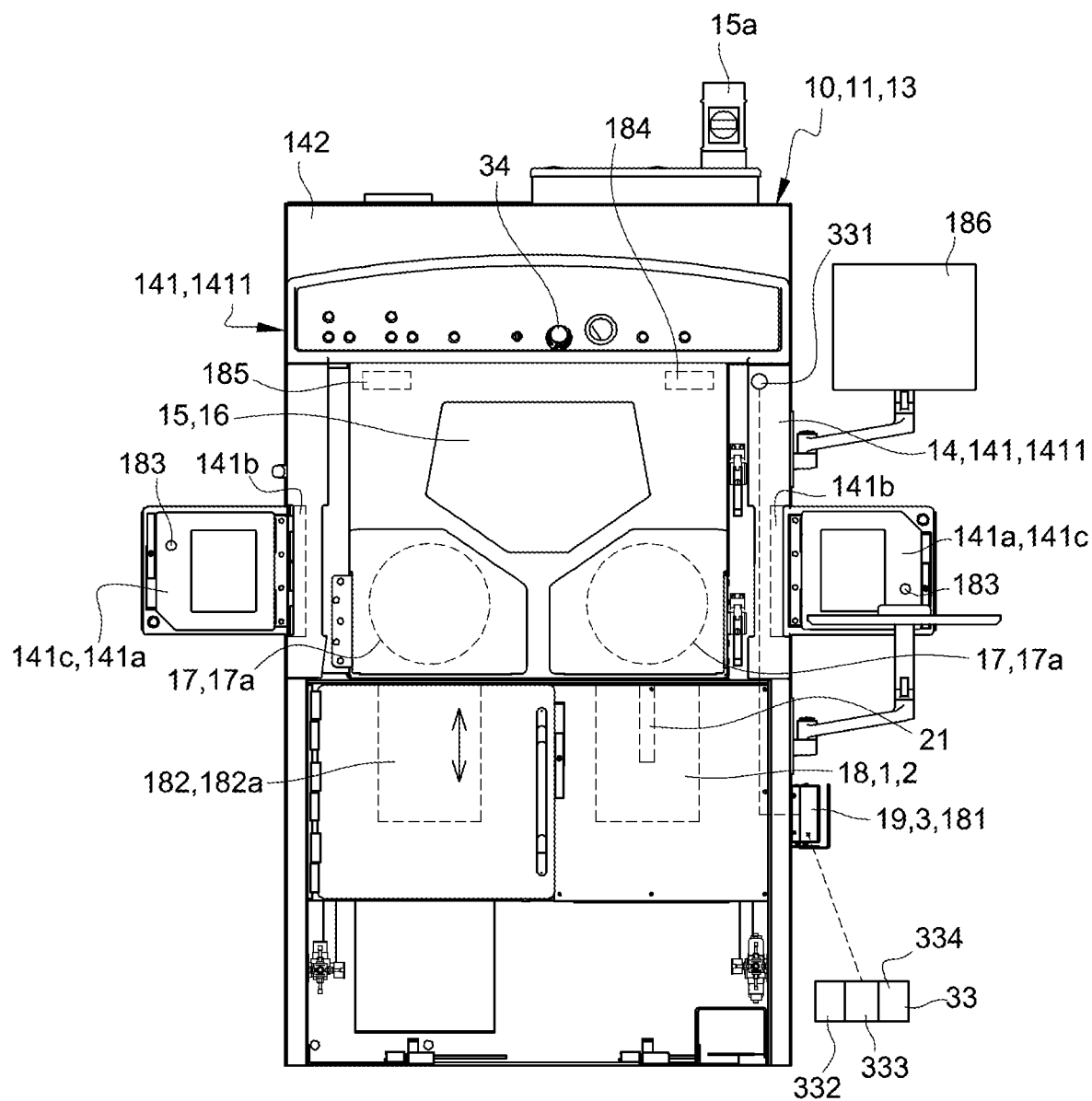
FIG. 5 is schematic front view, showing a radiation protection enclosure fitted with the calibrator device according to the invention.
Figure 6:
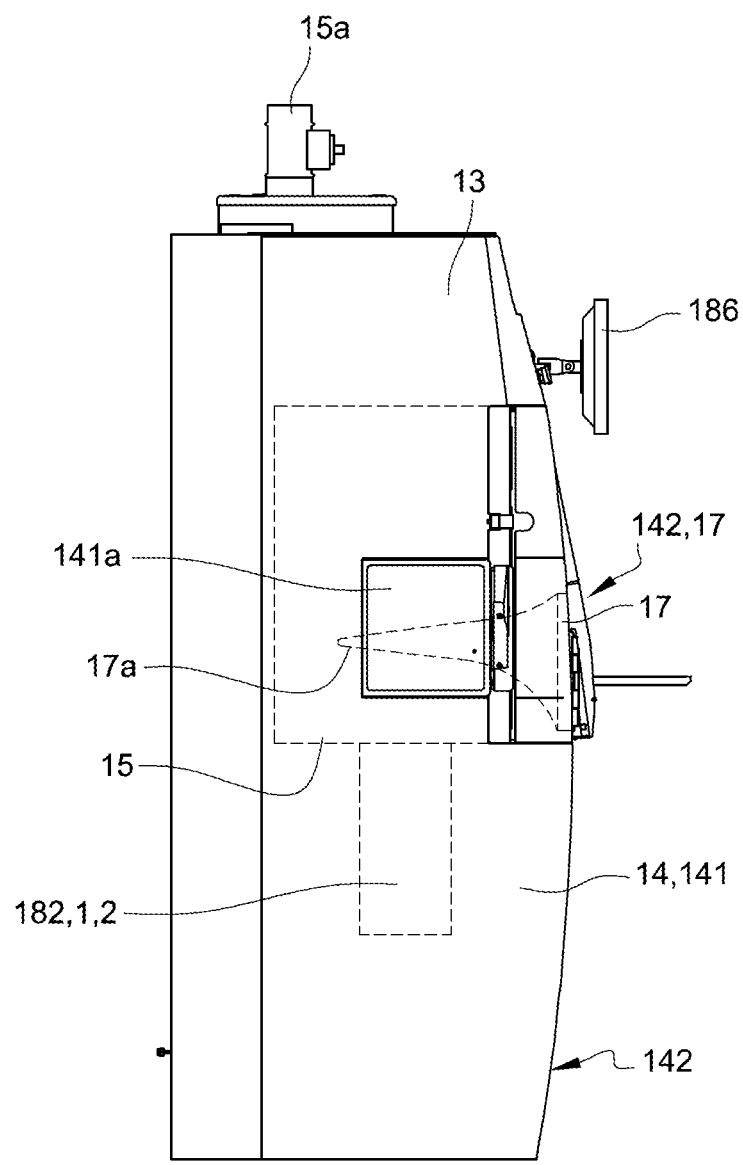
FIG. 6 is schematic side view, showing the radiation protection enclosure according to FIG. 5.

According to another embodiment, schematically illustrated in FIGS. 5 and 6, the radiation protection structure 11 comprises a radiation protection enclosure 13 suitable for the handling of radioelements by an operator.

Such a radiation protection enclosure 13 is suited to the field of nuclear medicine, in particular for the preparation of low, medium and high energy radiopharmaceutical compositions.

Such an enclosure allows for example the elution of Technetium (Tc99m) generators, the reconstitution of radiopharmaceutical kits as well as the preparation of patient-syringes for conventional scintigraphic examinations.

This radiation protection enclosure 13 is of the type currently called "glove box", "shielded enclosure", "shielded cell" or "hot cell".

For that purpose, the radiation protection enclosure 13 comprises radiation protection walls 14 (advantageously comprising a radiation attenuation material, for example lead, a plastic material filled with radiation protection metal particles, or also glass filled with radiation protection metal particles) delimiting a sealed volume 15 intended to contain the radioelements.

The radiation protection walls 14 comprise in particular:
lateral radiation protection walls 141, and
a front radiation protection wall 142, laterally lined with the lateral radiation protection walls 141 and in front of which an operator is intended to sit during the handling operations.

The radiation protection walls 14 comprise:
a transparent radiation protection wall 16, for visual access to the sealed volume 15, and
at least one aperture 17, here two in number, each fitted with a glove 17a for handling operations within the sealed volume 15.

The apertures 17 are here arranged at the front radiation protection wall 142 and are each fitted with a glove 17a (protruding in the sealed volume 3) for the passage of the hands for the various handling operations.

Each glove 17a is tightly sealed to its associated aperture 17.

As an alternative or a complement to the gloves 17a, the radiation protection enclosure 13 can be fitted with a remote handling interface (or apparatus), also called "remote handler" (for example, a remote handling arm), to avoid introducing the hands into the radiation protection enclosure 13 (not shown).

One at least of the radiation protection walls 14, herein each of the two radiation protection walls 141, can also be fitted with an airlock 141a (also called "transfer box").

Such an airlock 141a can be used for the transfer of accessories and consumables with respect to the sealed volume 15.

For a protection of the operators, each airlock 141a advantageously includes an inner door 141b and an outer door 141c.

Preferably, the sealed volume 15 is vacuumed by means of an air vacuuming system 15a.

To ensure its operation, the radiation protection enclosure 13 also comprises:
at least one piece of electronic equipment 18 (also called "peripheral" or "operating part"), controllable by the operator, and
control means 19, for the control of said at least one piece of electronic equipment 18 by the operator.

The term "electronic equipment 18" advantageously includes any electronic equipment, conventional per se, intervening in the operation of the radiation protection enclosure 13.

Herein, said at least one piece of electronic equipment 18 includes at least the calibrator device 1 according to the invention (described hereinabove in relation with FIG. 1).

The electronic/computer system 3 of the calibrator device 1 here constitutes the control means 19 of the radiation protection enclosure 13.

As an alternative, not shown, the electronic/computer system 3 of the calibrator device 1 is distinct from the control means 19 of the radiation protection enclosure 13.

Moreover, the control means 19 of the radiation protection enclosure 13 comprise voice control means.

These voice control means are here formed by the voice control means 33 of the calibrator device 1. As an alternative, not shown, the control means 19 of the radiation protection enclosure 13 comprise voice control means that are distinct from the voice control means 33 of the calibrator device 1.

Such voice control means 33 thus enable the operator to conduct a handling protocol, and to interact with said at least one piece of electronic equipment 18, while keeping the hands in the gloves (or on the remote handling interface).

Generally, the radiation protection walls 14 comprise two lateral radiation protection walls 141 each including a front edge 1411.

The front edge 1411 of one at least of the lateral radiation protection walls 141 is fitted with said at least one microphone 331.

As an alternative, said at least one microphone 331 can be at any other location on the radiation protection enclosure 13, or even be a portable microphone.

In addition to the calibrator device 1, the radiation protection enclosure 13 advantageously comprises at least one piece of electrical equipment 18 chosen among one at least of the following pieces of electronic equipment:
at least one computer 181 comprising data storage means containing a database,
operating means 182 coupled to at least one shielded generator compartment 182a,
locking means 183 associated with at least one door 141b, 141c of at least one airlock 141a fitted to one of said radiation protection walls 14,
means 21 for operating a calibrator spoon (not shown),
lighting means 184, to light the sealed volume 15, for example LED lamps,
disinfection means 185, for the disinfection of the sealed volume 15, for example a UV lamp,
at least one output peripheral 186, for example in the form of a display device (screen) or even printing means (not shown), for example for printing a self-adhesive label,
a remote handling apparatus, also called "remote handler" (for example, a remote handling arm).

Said at least one computer 181, conventional per se, advantageously comprises:
a processing unit, also called "calculation unit" or "processor",
data storage means containing a database and at least one computer program.

Said at least one computer 181 is advantageously connected to at least another piece of electronic equipment 18 of the radiation protection enclosure 13, or even with a computer network.

The operating means 182, 21 consist for example of lifts for moving between a low position, out of the sealed volume 15, and a high position, within the sealed volume 15.

The operating means 182 (coupled to at least one shielded generator compartment 182a) can include two independent lifts, for operating two shielded generator compartments 182a.

The locking means 183 consist for example of an electric strike.

In practice, said at least one piece of electronic equipment 18 is thus intended to be controlled by the operator at different steps of a handling process.

The control of said at least one piece of electronic equipment 18 may consist for example of:
inputting data (for example on the computer 181), and/or
setting/adjusting an operation parameter, for example of the lighting means 184 and/or the calibrator device 1, and/or
operating an actuator (for example the operating means 182, 21).

For that purpose, and as described hereinabove in relation with FIG. 1, the voice control means 33 of the radiation protection enclosure 13 comprise:

at least one microphone 331, capable of capturing a voice instruction V emitted by the operator for controlling at least one piece of electronic equipment 18 (including the calibrator device 1), a recognition module 332, designed to convert said voice instruction V into a request R that can be executed by at least one piece of electronic equipment 18, and a control module 333, designed to control the execution of the request R by said at least one piece of electronic equipment 18.

The recognition module 332 is advantageously chosen among the computer programs comprising instructions that, when the program is executed by a computer, cause the latter to convert the voice instruction V into a request R intended to be executed by said at least one piece of electronic equipment 18.

Without being restrictive, the voice instruction V is advantageously chosen from a list of predefined voice instructions, recorded in a database. And each voice instruction V of this database is advantageously associated with a request R (also called "action") intended to be executed by said at least one piece of electronic equipment 18.

For example and without being restrictive in anyway, in addition to the instructions for the calibrator device 1, the combination of action words M2/parameter words M3 can be chosen among:

"select"/"Container Name" (for example vial, syringe, capsule), to select a container on the computer 181, "select"/"Isotope Name" (for example F18, Fluorine, Tec, Technetium, Ga67, Gallium), to select an isotope on the computer 181, "patient"/"variable", to select the patient via the computer 181, "stock solution"/"variable", to select the stock solution via the computer 181, "validate", to validate the solution and patient selection via the computer 181, "up" or "down"/"generator", to control the operating means 182 up or down, "open" or "close"/"inner door" or "outer door" (possible "left" or "right"), to open or close an inner door or an outer door of an airlock 141a using the locking means 183, "up" or "down"/"spoon", to move the calibrator spoon up or down using the operating means 21, "turn on" or "increase" or "dim" or "turn off"/"light", to turn on, increase, dim or turn off, respectively, the lighting means 184.

Moreover, the control means 19 may also include manual control means 34, for example in the form of a control panel or at least one pedal, for the control of said at least one piece of electronic equipment 18 by said operator.

The voice control means will thus enable the operator to control said at least one piece of electronic equipment 18 via voice instructions.

This approach thus enable the operator to conduct a handling protocol, and to interact with said at least one piece of electronic equipment 18, while keeping the hands in the gloves (or on the remote handler).

The operator thus gains in comfort and speed of execution, and can therefore focus to the handling operations.

The invention claimed is:

1. A calibrator device designed to measure the activity of a radioelement, said calibrator device comprising:
an ionisation chamber, intended to receive said radioelement,
an electronic/computer system, for controlling the operation of said calibrator device, and
at least one output peripheral,
said electronic/computer system comprising:
a processor that converts a signal collected within said ionisation chamber into a value of activity of said radioelement, and
control means, for the control of said electronic/computer system by an operator,
wherein said control means comprise voice control means that comprise:
at least one microphone, capable of capturing a voice instruction emitted by said operator,
a recognition module, designed to convert said voice instruction into a request that can be executed by said electronic/computer system, and
a control module, designed to control the execution of said request by said electronic/computer system,
wherein the recognition module is designed to convert said voice instruction comprising a series of words:
an activation word, and
an action word.

2. The calibrator device according to claim 1, wherein said electronic/computer system comprises a casing in which is integrated at least part of said electronic/computer system,
and wherein said at least one microphone is fitted to said casing or is independent of said casing.

3. The calibrator device according to claim 2, wherein the voice control means comprise a confirmation module designed to reproduce, via said at least one output peripheral, the request from said recognition module.

4. The calibrator device according to claim 2, wherein the control means also comprise manual control means, for the redundant control of said electronic/computer by said operator.

5. The calibrator device according to claim 1, wherein the voice control means comprise a confirmation module designed to reproduce, via said at least one output peripheral, the request from said recognition module.

6. The calibrator device according to claim 5, wherein the control means also comprise manual control means, for the redundant control of said electronic/computer by said operator.

7. The calibrator device according to claim 1, wherein the control means also comprise manual control means, for the redundant control of said electronic/computer by said operator.

8. A method of operating a calibrator device according to claim 1, comprising:
a step of capturing a voice instruction emitted by said operator, executed by said at least one microphone,
a step of converting said voice instruction into a request executable by said electronic/computer system, executed by said recognition module, and
a step of controlling the execution of said request by said electronic/computer system, executed by said control module.

9. Nuclear medicine equipment, comprising:
a calibrator device according to claim 1, and
a radiation protection structure, for protecting an operator against ionising radiations.

10. The nuclear medicine equipment according to claim 9, wherein said radiation protection structure comprises a radiation protection screen.

11. The nuclear medicine equipment according to claim 10, wherein the radiation protection screen comprises a shield made of a radiation protection material, said shield being rotatable about a horizontal axis of rotation, for tilt adjustment.

12. The nuclear medicine equipment according to claim 9, wherein said radiation protection structure comprises a radiation protection enclosure suitable for the handling of radioelements by an operator, said radiation protection enclosure comprising:

radiation protection walls delimiting a sealed volume intended to contain said radioelements, a transparent radiation protection wall, for visual access to said sealed volume, and at least one aperture fitted with a glove, and/or a remote handling interface, for handling operations within said sealed volume, said radiation protection enclosure also comprising:

at least one piece of electronic equipment, controllable by said operator, and control means, for the control of said at least one piece of electronic equipment by said operator, said at least one piece of electronic equipment comprising at least said calibrator device.

13. The nuclear medicine equipment according to claim 12, wherein the electronic/computer system of said calibrator device is part of the control means of said radiation protection enclosure or is distinct from said control means of said radiation protection enclosure.

14. The nuclear medicine equipment according to claim 12, wherein the control means of said radiation protection enclosure comprise voice control means that form the voice control means of said calibrator device, or that are distinct with respect to the voice control means of said calibrator device.

15. The nuclear medicine equipment according to claim 12, wherein said radiation protection enclosure comprise, in addition to said calibrator device, at least one piece of electric equipment chosen among one at least of the following pieces of electronic equipment:

at least one computer comprising data storage means containing a database, operating means coupled to at least one shielded generator compartment, locking means associated with at least one door of at least one airlock fitted to one of said radiation protection walls, means for operating a calibrator spoon, lighting means, disinfection means, a remote handling interface.

16. The nuclear medicine equipment according to claim 12, wherein the radiation protection walls comprise two lateral radiation protection walls each including a front edge, said front edge of one at least one of said lateral radiation protection walls being fitted with said at least one microphone.

17. The calibrator device according to claim 1, wherein said electronic/computer system comprises a casing in which is integrated at least part of said electronic/computer system.

18. The calibrator device according to claim 1, wherein the voice control means comprise a confirmation module designed to reproduce the request from said recognition module.

19. The calibrator device according to claim 1, wherein the control means also comprise manual control means.

20. The calibrator device according to claim 1, wherein the series of words further comprises at least one setting word.

\* \* \* \* \*